United States Patent Office 3,556,920
Patented Jan. 19, 1971

3,556,920
SHAPED FIBROUS LAMINATES IMPREGNATED WITH DIANHYDRIDE CROSS-LINKED EPOXY RESINS
Maurice Balme and Max Gruffaz, Lyon, France, assignors to Rhone-Poulence, S.A., Paris, France, a French body corporate
No Drawing. Filed Feb. 12, 1968, Ser. No. 704,568
Claims priority, application France, Feb. 24, 1967, 96,476
Int. Cl. B32b 27/04, 27/12, 27/38
U.S. Cl. 161—185
4 Claims

ABSTRACT OF THE DISCLOSURE

Dianhydrides of formula:

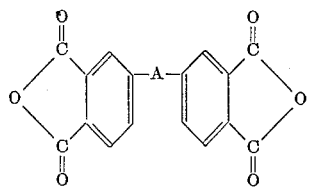

in which A is an azo or azoxy group, are used as hardeners for epoxy resins which, while effective, do not dequire the use of a moderating agent. They are useful for example in the production of laminates and moulded articles.

---

This invention relates to a process for hardening epoxy resins in which anhydrides of polycarboxylic acids are employed as hardening agents.

There have already been on the market for many years, under the name "epoxy resins," compositions which may take the form of more or less viscous liquids or of solids of low melting point, depending upon the proportions and the exact nature of the reactants used in making them. Typical examples of these compositions are the products of condensation in alkaline medium of glycol epichlorhydrin with organic compounds having alcoholic or phenolic hydroxyl groups.

These compositions can be irreversibly hardened under the influence of heat in the presence of amino agents or acids, to give three-dimensional materials which possess remarkable properties of adhesion, hardness and resistance to chemical agents. These materials have found wide outlets in the aircraft industry in the form of composite articles.

It is known (U.S. Pat. No. 2,324,483) that epoxy resins may be hardened by means of anhydrides of dicarboxylic acids and that phthalic acid has been widely recommended for this purpose. Subsequently, it was proposed to improve the electrical properties of the hardened resins and reduce their flammability by employing polyhalogenated anhydrides [Robitschek and Nelson, Ind. Eng. Chem. 48 1951 (1956)], and also to improve the stability in storage of the mixtures containing the hardener by using anhydrides which are liquid at ambient temperature or possess a fairly low melting point [Weiss Ind. Chem Eng. 49 1089 (1957)].

It has also been proposed, to raise the softening temperature and improve the resistance of the cross-linked resins to solvents, to increase the extent of cross-linking by employing polyanhydrides as hardening agents. Thus, it has been proposed to effect the hardening of epoxy resins of various types by means of dianhydrides of tetracarboxylic acids, such as pyromellistic acid, dimethylhexahydronaphthyltetracarboxylic acid, cyclopentanetetracarboxylic acid, benzophenonetetracarboxylic acid and diphenylmethanetetracarboxylic acid, as also of condensates obtained from a bifunctional agent and a tricarboxylic anhydride or addition products of dialkylbenzenes with maleic anhydride. In this field Diels-Alder addition products of maleic anhydride and a polycyclopentadienyl derivative have also been recommended.

However, the use of these dianhydrides is accompanied by a number of disadvantages, some of which are due to the fact that they possess excessive reactivity to complementary groups in the resins. In order to obtain a homogeneuos resin-hardener mixture without producing gelling, it is then necessary to moderate the activity of the hardener by carrying it into the resin by means of a monoanhydride, which considerably reduces the extent of the advantages inherent in the dianhydride. Less reactive dianhydrides which might otherwise be used are often not readily obtainable or give resins which, in the hardened state, are not satisfactory under severe conditions, for example at high temperatures.

The present invention provides a new process for hardening epoxy resins by heating a mixture thereof and a polycarboxylic acid anhydride, in which there is employed as hardener a dianhydride of the general formula

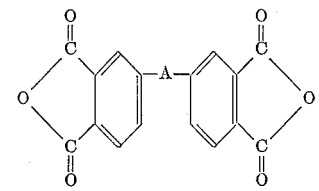

in which the divalent symbol A represents an azo group —N=N—, or an azoxy group

This process has the advantage of involving the use of readily accessible dianhydrides which moreover, are readily incorporated into the epoxy resins without the use of a monoanhydride, and which give rise to hardened resins which have remarkably good resistance to thermal stresses resulting, for example, from prolonged exposure to temperatures of the order of 250° to 300° C.

All the usual epoxy resins may be hardened by the use of these anhydrides, including, for example, the glycidic ethers obtained by reacting polyols such as glycerol, trimethylolpropane, butanediol or pentaerythritol, with glycol epichlorhydrin, the glycidic ethers of phenols such as 2,2-bis(4-hydroxyphenyl)propane, bis(hydroxyphenyl)methane, resorcinol, hydroquinone, pyrocatechin, phloroglucinol, 4,4'-dihydroxydiphenyl and phenol/aldehyde condensation products. The products of reaction of epichlorhydrin with primary or secondary amines such as bis(4 - methylaminophenyl)methane or bis(4 - aminophenyl)sulphone, and the aliphatic or alicyclic polyepoxides obtained by epoxidation of the corresponding unsaturated derivatives by means of peracids, may also be employed.

These various types of epoxy resins are now well described in the literature and, in regard to their preparation, reference may be made, for example, to the work by Houben-Weyl, Volume 14/2, page 462.

The process of the invention is particularly interesting for the hardening of epoxy resins in which each molecule possesses at least 2 and preferably more than 3 epoxy groups. Of the latter, there will be preferred the essentially aromatic resins such as glycidic ethers of poly(hydroxyphenyl)alkanes and phenol-formaldehyde resins.

The dianhydrides cf Formula I are readily obtainable from 4-nitrophthalic acid or anhydride. A particularly advantageous process of preparation consists in reducing 4-nitrophthalic acid by means of aluminium in the presence of an alkali metal hydroxide such as sodium hydroxide. Depending upon the proportion of reducing agent employed, the reduction gives azophthalic acid or azoxyphthalic acid, which may be dehydrated to the corresponding anhydride by heating or by the action of a dehydrating agent such as an anhydride of a lower organic acid.

The proportion of dianhydride in relation to the resin to be hardened may vary between wide limits. It is usually so chosen that the ratio $$\frac{\text{number of anhydride groups}}{\text{number of epoxy groups}}$$

is from 0.2:1 to 1.5:1 and preferably from 0.5:1 to 1.1:1.

The mixtures of epoxy resin and hydride may be hardened at temperatures of 80° to 350° C., preferably 100° to 250° C.

To facilitate the dispersion of the dianhydride in the resin, it may be advantageous first to dissolve the latter in a usual solvent such as a ketone or an aliphatic or aromatic hydrocarbon or chlorinated hydrocarbon.

The process of the invention is particularly interesting for the preparation of composite materials, mainly in the form of laminates or molded objects. The basis of such laminates may be a mineral, vegetable or synthetic fibre. Moulded objects may contain fillers of various kinds, such as graphite, asbestos, mica, silica, talcum, aluminas or titanium oxides. The process is also suitable for bonding and coating various materials.

The following examples illustrate the invention. Proportions are by weight.

EXAMPLE 1

In 135 cc. of acetone are dissolved 40 g. of an epoxy resin which may be represented by the mean formula:

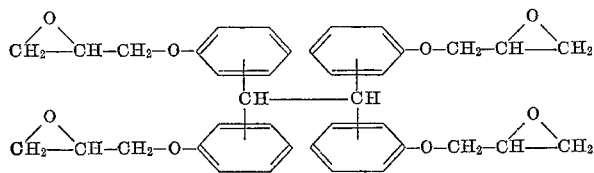

This resin, which has a mean molecular weight of 703 and which contains on average 0.450 epoxy group per 100 g., is marketed under the name "Epon 1031."

18.3 g. of azophthalic anhydride is added at 25° C. to the solution, and the mixture is stirred for 15 minutes. The quantity of anhydride employed corresponds to a ratio $$\frac{\text{number of anhydride groups}}{\text{number of epoxy groups}}$$

of 0.617:1.

A specimen of glass fabric in the form of a square having sides measuring 60 cm. is coated with the suspension thus obtained. (This fabric is of the satin type having a specific gravity of 308 g./m.², which has undergone thermal degreasing, followed by coating with a layer of gamma-aminopropyltriethoxysilane.)

The treated fabric is dried at 40° C. under reduced pressure, first under 200 mm. Hg for 30 minutes and then under 10 mm. Hg for the same period. After this treatment, it contains 34.5% of resin.

This specimen is cut into 16 parts of equal dimensions (15 cm. x 15 cm.), which are stacked to form a laminated assembly, which is placed between the plates of a press heated at 154° C. under a low pressure, called the contact pressure, for 1 minute and then under 32 kg./cm.² for 40 minutes. The assembly is then heated in an oven at 230° C. for 15 hours.

The laminate thus obtained contains 31.8% of resin and has a bending strength of 45 kg./mm.².

When it is subjected to a severe heat treatment by keeping it at 300° C. in a ventilated oven, the change of the bending strength as a function of time is as follows:

|  | Kg./mm.² |
|---|---|
| After 55 hours | 46.8 |
| After 103 hours | 39 |
| After 225 hours | 25 |

These results show that the laminate retains excellent mechanical properties after prolonged exposure to a high temperature.

EXAMPLE 2

(a) A suspension of 15.95 g. of azophthalic anhydride in a solution of 39 g. of epoxy resin in 135 cc. of acetone is prepared as in Example 1. The ratio $$\frac{\text{number of anhydride groups}}{\text{number of epoxy groups}}$$

is 0.55:1.

A specimen of glass fabric having the same characteristics as that employed in Example 1 and having a surface of 2700 cm.² is coated with this suspension. After drying, the resin content of the fabric is 39.75%.

The specimen is cut into 12 parts of equal dimensions (13.5 cm. x 13.5 cm.), which are stacked to form a laminated assembly. This assembly is disposed between the plates of a press heated at 140° C., the minimum spacing of which is set to 3.15 mm. by means of auxiliary wedging means. The plates are then brought to this position of minimum spacing.

After 1 hour, the temperature is gradually raised to 250° C., and the laminate is then allowed to cool.

The laminate obtained contains 34.4% by weight of resin and has a bending strength of 44.2 kg./mm.². When held at 300° C., the change of the bending strength as a function of time is as follows:

|  | Kg./mm.² |
|---|---|
| After 48 hours | 46.2 |
| After 168 hours | 38.1 |
| After 240 hours | 25.7 |

(b) By way of comparison, 4.7 g. of pyromellitic anhydried is added to a solution of 17.3 g. of the same epoxy resin in 50 cc. of acetone, giving a suspension in which the ratio $$\frac{\text{number of anhydride groups}}{\text{number of epoxy groups}}$$

is 0.55:1.

A glass fabric is coated with this mixture as before and there is formed a laminated assembly comprising 12 rectangular portions (9 cm. x 8.5 cm.) of coated and dried fabric.

The whole is compressed between the plates of a press at 112° C., first under a simple contact pressure for 1½ minutes and then under 32 kg./cm.² for 1 hour. Hardening is completed by keeping the laminate in an oven at 200° C. for 16 hours. The resulting laminate contains 30.4% of resin and has a bending strength of 40.7 kg./mm.².

After 48 hours in a ventilated oven at 300° C., this strength is only 22.8 kg./mm.².

(c) Again by way of comparison, the procedure of Example 2(a) is followed, using 16.95 g. of resin and 50 cc. of acetone, and replacing the azophthalic anhydride by 5.05 g. of cyclopentanetetracarboxylic acid anhydride, the ratio $$\frac{\text{number of anhydride groups}}{\text{number of epoxy groups}}$$

still being 0.55:1.

With this mixture, a laminate is prepared as described under (b), except that the hardening in the press takes place at 120° C. for 2 hours instead of at 112° C. for 1 hour.

The resulting laminate contains 24.8% of resin and has a bending strength of 40.8 kg./mm.$^2$.

After 48 hours at 300° C., this strength is only 12.6 kg./mm.$^2$, while the resin content falls to 14%.

EXAMPLE 3

The procedure of Example 1 is followed, using 40 g. of epoxy resin, 135 cc. of acetone and 18.3 g. of azophthalic anhydride. The laminated assembly is disposed between the plates of a press heated at 150° C. under a pressure of 32 kg./cm.$^2$ for one hour. The temperature is then raised to 280° C. in 15 minutes, whereafter the assembly is allowed to cool to 75° C. under this pressure.

The compact laminate thus obtained is kept for 120 hours in a ventilated oven at 250° C. After cooling, it has a resin content of 31.3% and a bending strength of 50.2 kg./mm.$^2$.

After exposure to 250° C. for 1000 hours, it still has a bending strength of 33.6 kg./mm.$^2$.

EXAMPLE 4

15 g. of an epoxy resin of the means formula:

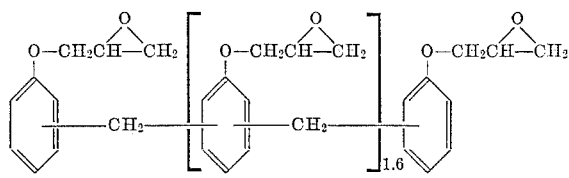

is dissolved in 75 cc. of benzene. This resin has a mean molecular weight of 650 and contains 0.554 epoxy group per 100 g.; it is marketed under the name "DEN 438."

To the solution is added 7.4 g. of finely ground azophthalic anhydride, and the mixture is stirred for 15 minutes. A glass fabric specimen of 1350 cm.$^2$, identical in nature to that of Example 1 is coated with the resulting suspension. The coated fabric is dried at 40° C. for 70 minutes under a progressive vacuum, the pressure finally falling to 5 mm. Hg.

12 rectangles (11 cm. x 9.5 cm.) of coated fabric are cut out and stacked, and the assembly is placed between the plates of a press heated at 180° C., and maintained under a pressure of 18 kg./cm.$^2$. Hardening is completed by an additional heat treatment in an oven at 200–220° C. for 24 hours.

The laminate obtained contains 26.7% of resin and has bending strength of 45.6 kg./mm.$^2$.

EXAMPLE 5

7.8 g. of the epoxy resin employed in Example 1, 80 cc. of acetone, and 1.15 g. of finely ground azophthalic anhydride are intimately mixed, and 36 g. of graphite of a grain size between 1μ and 14μ are added to the mixture, whereafter the whole is stirred to produce a homogeneous mixture, the solvent of which is evaporated at 25° C. under a progressive vacuum, the absolute pressure finally falling to 5 mm. Hg.

The residue is finely ground and there are finally obtained after screening 45.1 g. of powder having a grain size of less than 50μ.

This powder is introduced into a cylindrical mould of diameter 7.6 cm. which is placed between the plates of a press heated to 250° C. for 2 hours under a pressure of 200 kg./cm.$^2$.

After mould release and cooling, the cylindrical object obtained is cut into parallelepipedic specimens (3 cm. x 1 cm. x 0.5 cm.), which have a bending strength of 7.5 kg./mm.$^2$ over a length of 2.54 cm.

After 160 hours at 300° C., this strength is still 4.4 kg./mm.$^2$.

EXAMPLE 6

The procedure of Example 5 is followed, the graphite being replaced by 36 g. of asbestos of a grain size in the neighbourhood of 5μ. Measured under the same conditions as in Example 5, the bending strength is 7.3 kg./mm.$^2$. After 130 hours in an enclosed space maintained at 300° C., the bending strength of the specimens still retains 62% of its original value.

EXAMPLE 7

A mixture of resin and dianhydride is prepared as in Example 1 from 38.6 g. of resin and 135 cc. of acetone, the azophthalic anhydride being replaced by 16.5 g. of azoxyphthalic anhydride. The quantity of anhydride employed corresponds to a ratio $$\frac{\text{number of anhydride groups}}{\text{number of epoxy groups}}$$

equal to 0.55:1.

A glass fabric specimen identical to that employed in Example 1, which has the form of a rectangle measuring 60 cm. x 45 cm., is coated with the resulting suspension and dried. The fabric then contains 39.9% of resin. This specimen is cut into 16 parts of equal dimensions (15 cm. x 11.25 cm.), which are stacked to form a laminated assembly. This assembly is disposed between the plates of a press heated at 120–125° C. for 3 minutes under contact pressure, and then under 43 kg./cm.$^2$ for 2 hours. The temperature is then gradually raised over 4 hours from 125° C. to 235° C. under this same pressure, and the assembly is finally allowed to cool in this position to 130° C.

After mould release and complete cooling, the laminate obtained contains 37.9% of resin and has a bending strength of 50.5 kg./mm.$^2$; after 72 hours at 300° C. this strength is still 45 kg./mm.$^2$.

We claim:

1. Shaped articles in the form of laminates comprising a plurality of fibrous sheets impregnated with a hardened epoxy resin in which the cross-linking groups are derived from a dianhydride of the general formula:

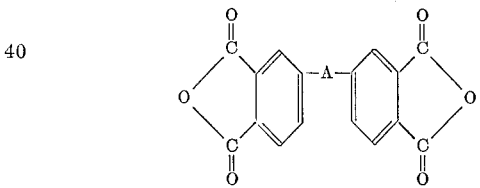

in which the divalent A represents a group selected from the class which consists of azo and azoxy groups.

2. Shaped articles according to claim 1, in which the epoxy resin is selected from the group which consists of glycidic ether of poly-(hydroxyphenyl)alkanes and glycidic ethers of phenolformaldehyde condensation products.

3. Shaped articles according to claim 1, in which the fibrous sheets comprise glass fibres.

4. Shaped articles according to claim 3, in which the epoxy resin is selected from the group which consists of glycidic ether of poly-(hydroxyphenyl)alkanes and glycidic ethers of phenolformaldehyde condensation products.

References Cited

UNITED STATES PATENTS

| | | | |
|---|---|---|---|
| 2,768,153 | 10/1956 | Shokal | 161—185X |
| 3,078,279 | 2/1963 | McCracken et al. | 260—346.3 |
| 3,242,142 | 3/1966 | Hyde | 260—47 |
| 3,329,652 | 7/1967 | Christie | 161—185X |
| 3,394,105 | 7/1968 | Christie | 161—185X |
| 3,400,098 | 9/1968 | Parry | 260—47X |
| 3,444,135 | 5/1969 | Greco et al. | 260—47 |
| 3,481,822 | 12/1969 | Wilson et al. | 161—185X |
| 3,481,823 | 12/1969 | Salyer et al. | 161—185X |
| 3,502,609 | 3/1970 | Barie et al. | 260—2X |

HAROLD ANSHER, Primary Examiner

U.S. Cl. X.R.

260—47, 837